June 19, 1945.   C. D. PETERSON ET AL   2,378,788
BALKING RING CLUTCH
Filed Aug. 7, 1943
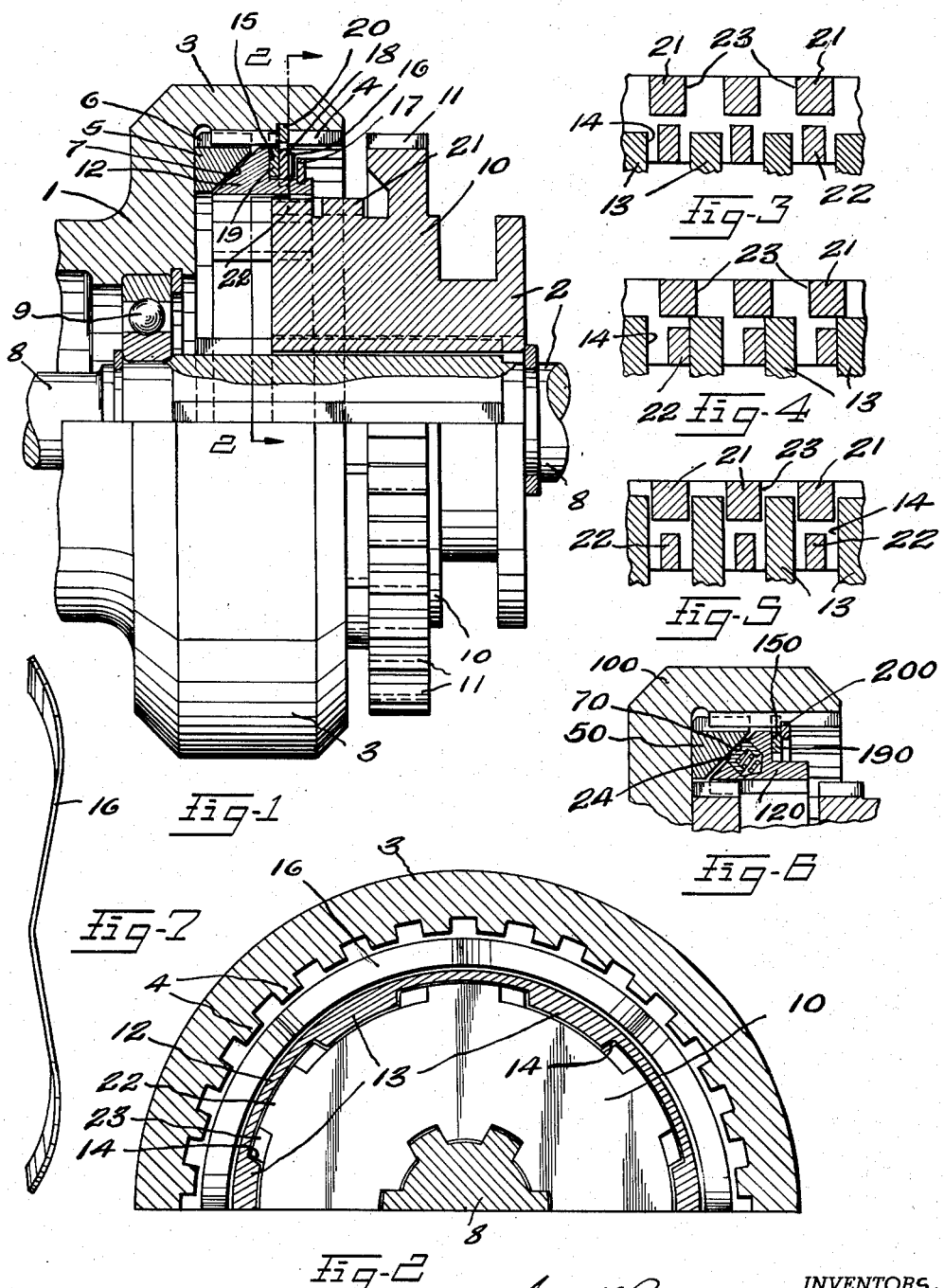

Patented June 19, 1945

2,378,788

UNITED STATES PATENT OFFICE 2,378,788

BALKING RING CLUTCH

Carl D. Peterson and Albert H. Deimel, Toledo, Ohio

Application August 7, 1943, Serial No. 497,840

8 Claims. (Cl. 192—53)

This invention relates to balking ring clutches where the balking ring or balking member is being constantly urged in one direction, or is spring loaded, so that it is always rocked to blocking position or located in blocking position, when the clutch is disengaged, regardless of relative speeds of the clutching members. It has for its object the arrangement of the yielding means or springs which load the balking ring, whereby the yielding means or the spring is carried by the balking ring as a unit therewith, in contradistinction to being carried by one of the clutch members, as the driving clutch member, or interposed between the driving clutch member and the balking ring, and further in contradistinction to being interposed between the shiftable clutch member and the balking ring.

The invention consists in the novel features and in the combinations and constructions hereinafter set forth and claimed.

In describing this invention, reference is had to the accompanying drawing in which like characters designate corresponding parts in all the views.

Figure 1 is a longitudinal sectional view, partly in elevation, of a balking ring clutch embodying this invention.

Figure 2 is a sectional view on line 2—2, Figure 1.

Figures 3, 4 and 5 are diagrammatic views of the action of the blocking means or balking teeth, Figure 3 showing the position of the teeth when a shift can be made; Figure 4 showing the position thereof when in balking position; and Figure 5 showing the position after the teeth have been brought out of the position shown in Figure 4 by the crossing of the speeds and the shifting in being completed.

Figure 6 is a fragmentary sectional view of a modified form of the invention.

Figure 7 is a detail view of the spring for the balking ring.

A modern balking ring clutch includes, generally, driving and driven structures adapted to be positively clutched, one of said structures having a set of clutch teeth and a friction surface, an axially shiftable toothed clutch member included in the other of said structures and adapted to mesh with said teeth, and a balking member or ring engageable with said friction surface and having blocking means and also limited rotation with respect to the other structure for positioning the blocking means in blocking relationship with respect to the shiftable clutch member, when said structures are rotating at relatively different speeds, and for disposing said blocking means out of said blocking relationship to permit clutching shift of said clutch member, when the speeds of said structures cross. This balking ring clutch, in addition, includes yielding means carried by the balking ring and acting thereon to urge the balking ring longitudinally with respect to the axis of rotation, thereby producing friction between the balking ring and the mating friction ring to induce the positioning of said blocking means into blocking position when the clutch structures are unclutched, so that the blocking means are in blocking position prior to clutching shift of said clutch member, and the speeds must be crossed before the clutch teeth can be intermeshed.

1, 2 designate, generally, driving and driven structures, the driving structure including a drive shaft having a head 3 formed with a cylindrical recess on the inner wall of which are provided splines, the outer end portions 4 of which constitute clutch teeth.

The friction surface of this driving structure is shown as provided on a separate ring 5 located in the recess against the bottom thereof and having peripheral teeth 6 interlocked with the inner ends of the splines of the head 3. The friction surface 7 is here shown as conical, although it may be flat. The driven structure includes a shaft 8 usually journalled at one end in a pilot bearing 9 in the driving structure 1, and an axially shiftable clutch member 10 slidably splined on the shaft 8, the clutch member having peripheral clutch teeth 11 for coacting with the clutch teeth 4.

12 designates the balking ring encircling a portion of the clutch member 10 and having internal teeth 13 working in grooves 14 in the clutch member 10 and being of greater width than the teeth 13 to permit a limited rocking movement of the balking ring 12. The balking ring is also provided with a conical friction face complemental to the friction face 7 of the ring 5.

One of the major features of this invention is the balking ring as 12 provided with a second friction face 15 here shown as radial with the axis of rotation and facing opposite to the conical friction face of the balking ring 12.

The yielding means is shown in Figure 1 as a spring in the form of a wave washer 16 interposed between an abutment ring 17 on the balking ring in the rear of the friction face 15 and thrusting in opposite directions against said abutment 17 and in a direction toward the friction face 15. As here illustrated, the spring 16 thrusts against a washer 18 slidably splined on the balking ring 12, the washer in turn thrusting against an additional friction washer 19, interlocked with the splines 4 of the driving member 1 so as to rotate therewith, the washer 19 thrusting against the friction face 15 of the balking ring. 20 designates a lock ring interlocked with the head 4 on the inner side thereof and coacting with the washer 19 to hold it, and hence the balking ring and parts carried thereby from axial displacement out of the head 3.

The clutch member 10 is also provided with blocking means or teeth 21 and with teeth 22, these being the teeth flanking the grooves 14 or extending between the internal splines 13 of the balking ring. These blocking teeth or projections 21 are of the same width as the spaces 23 between the internal teeth 13 of the balking ring. Preliminary to making a shift, the balking teeth 21 are in position relative to passages 23 of the balking ring between the splines 13, as shown in Figure 4, wherein the balking teeth 21 will abut against the ends of the internal splines or teeth 13 of the balking ring on one side or the other of the spaces 23. As the speeds cross, this being effected by deceleration in the case of an up-shift, and acceleration in the case of a down-shift, the teeth or blocking projections 21 are brought into alinement with the spaces 23 or the spaces 23 brought into alinement with the projections 21, so that shifting in can be completed, as shown in Figure 5. When the parts are in the position shown in Figure 5, the clutch teeth 11 can be brought into mesh with the clutch teeth 4 without clashing. Immediately after declutching, the blocking teeth 21 and the splines 13 of the balking ring are, for an instant, in the position shown in Figure 3, but then due to the friction between the balking ring or its face 15 and the washer 19 due to the spring 16, the balking ring is immediately rocked, so that the balking projections 21 are out of alinement with the spaces 23 between the splines 13 of the balking ring.

In Figure 6, a modified form of carrying the yielding means on the balking ring is shown. In this figure, the yielding means is shown as spring-pressed plungers 24 in depressions formed in the balking ring 120 and normally pressed outwardly beyond the friction face of the balking ring to coact with the friction face of the balking ring 50. The action of these plungers forces the balking ring 120 to the right, causing its friction face 150 to coact with the friction washer 190 rotatable with the driving structure 100 and held in position by a lock ring 200.

In the form shown in Figures 1 and 6, one of the structures, as the driving structure 1 (Figure 1), or 100 (Figure 6), is provided with opposing friction surfaces 7 or 70 and 15 or 150 and the yielding means carried by the balking member 12 or 120 is the wave washer 16 or spring-pressed plunger 24, which act to thrust the balking ring to bring the friction faces 15 or 150 engaged with the friction washer 19 or 190. The action of this spring means in both cases tends to separate the conical friction faces.

The main friction faces of the balking ring are shown as conical, but their angle, area, etc. depend upon a number of factors, and the conditions and situations in which the clutch is to be used. They are, however, not of sufficient area to transmit appreciable torque but are of sufficient area to control the rocking of the balking ring, when the blocking teeth or projections 21 are engaged, as shown in Figure 4, with the ends of the teeth 13 of the balking ring, and overcome the friction between the blocking teeth 21 and the ends of the teeth 13, as the speeds cross.

What we claim is:

1. In a balking ring clutch including driving and driven structures adapted to be positively clutched, one of said structures having a set of clutch teeth and a friction surface, the other of said structures including an axially shiftable toothed clutch member drivingly carried by the other of said structures and adapted to mesh with said teeth, a balking member engageable with said friction surface and having blocking means and a limited rotation with respect to said other structure for positioning said blocking means in blocking relationship with respect to said clutch member when said structures are rotating at relatively different speeds and for disposing said blocking means out of said blocking relationship to permit clutching shift of said clutch member when the speeds of said structures cross; the combination of loaded resilient means carried by said balking member and acting axially thereon to urge the latter axially to induce positioning of said blocking means into blocking position prior to clutching shift of said clutch member.

2. In a balking ring clutch, driving and driven structures adapted to be positively clutched, one of said structures having a set of clutch teeth and opposing friction surfaces, the other of said structures including an axially shiftable toothed clutch member adapted to be brought into mesh with said teeth, a balking member engageable with the one friction surface and having blocking means and a limited rotation with respect to the other structure for positioning said blocking means in blocking relationship with respect to said clutch member when said structures are rotating at relatively different speeds, and for disposing said blocking means out of said blocking relationship to permit clutching of said clutch members when the speeds of said structures cross, loaded resilient means carried by the balking member and normally acting thereon to urge the balking member axially into frictional engagement with the other friction surface in a direction longitudinally with respect to the axis of rotation to induce positioning of said blocking means into blocking position prior to clutching shift of said clutch member.

3. The clutch structure of claim 2 in which the balking member is a ring encircling said other structure, and an axially shiftable washer rotatable with the first structure and coacting with said other friction surface, and the resilient means is a spring thrusting in opposite directions against a fixed abutment on the balking ring and another washer rotatable with the balking ring and coacting with the former washer.

4. A balking ring clutch including driving and driven structures, one of which is axially shiftable, said structures being provided with clutch teeth normally out of engagement, one structure having a friction surface, a balking ring coacting with said other friction surface and encircling the other structure, the balking ring having blocking means and a limited rotation with respect to said other structure for positioning said blocking means in blocking relationship with said clutch member when said structures are rotating at relatively different speeds, and for disposing said blocking means out of said blocking relationship to permit clutching shift of the shiftable clutch member when the speeds of said structures cross, the balking ring having an annular peripheral surface, a friction washer rotatable with the first structure and engaging said friction surface, a friction washer coacting with the former friction washer and rotatable with the balking ring, a fixed abutment on the balking ring, loaded spring means between the fixed abutment and the latter friction washer, all arranged so that the washers are shiftable axially of the balking ring, and a lock means on the first structure coacting with the washer which rotates with the first structure to prevent axial displacement of the balking ring and yielding means thereon.

5. In a balking ring clutch including driving and driven structures adapted to be positively clutched, one of said structures having a set of clutch teeth and a friction surface, the other of said structures including an axially shiftable toothed clutch member drivingly carried by the other of said structures and adapted to mesh with said teeth, a balking member engageable with said friction surface and having blocking means and a limited rotation with respect to said other structure for positioning said blocking means in blocking relationship with respect to said clutch member when said structures are rotating at relatively different speeds and for disposing said blocking means out of said blocking relationship to permit clutching shift of said clutch member when the speeds of said structures cross; the combination of loaded resilient means carried by said balking member and acting axially thereon to urge the latter axially in one direction to induce positioning of said blocking means into blocking position prior to clutching shift of said clutch member, and means for holding the balking member from axial movement in the opposite direction as to prevent unloading of the said resilient means.

6. In a balking ring clutch, driving and driven structures adapted to be positively clutched, one of said structures having a set of clutch teeth and opposing friction surfaces, the other of said structures including an axially shiftable toothed clutch member adapted to be brought into mesh with said teeth, a balking member engageable with the one friction surface and having blocking means and a limited rotation with respect to the other structure for positioning said blocking means in blocking relationship with respect to said clutch member when said structures are rotating at relatively different speeds, and for disposing said blocking means out of said blocking relationship to permit clutching of said clutch members when the speeds of said structures cross; the combination of loaded resilient means carried by the balking member and normally acting thereon to urge the balking member axially in one direction into frictional engagement with the other friction surface in a direction longitudinally with respect to the axis of rotation to induce positioning of said blocking means into blocking position prior to clutching shift of said clutch member, and means for holding the balking member from movement in the opposite direction to prevent unloading of the resilient means.

7. In a balking ring clutch including driving and driven structures adapted to be positively clutched, one of said structures having a set of clutch teeth and a friction surface, the other of said structures including an axially shiftable toothed clutch member drivingly carried by the other of said structures and adapted to mesh with said teeth, a balking member engageable with said friction surface and having blocking means and a limited rotation with respect to said other structure for positioning said blocking means in blocking relationship with respect to said clutch member when said structures are rotating at relatively different speeds and for disposing said blocking means out of said blocking relationship to permit clutching shift of said clutch member when the speeds of said structures cross; the combination of said balking member having a friction face presented in the opposite direction to that coacting with said friction surface, said one of the structures having a washer rotatable therewith and shiftable axially thereof in one direction from starting position for coacting with said oppositely presented surface of the balking member, locking means on said one of the structures for holding said washer from axial displacement away from the balking member, an abutment rotatable with the balking member and spaced axially from said washer, and spring means thrusting in opposite directions against the abutment and toward said washer, which is rotatable with said one of the structures.

8. A balking ring clutch including driving and driven structures, one of which is shiftable axially, said structures being provided with clutch teeth normally out of engagement, one structure having a friction face, encircling the other structure, the balking ring having blocking means and a limited rotation with respect to said other structure for positioning said blocking means in blocking relationship with said clutch member when said structures are rotating at relatively different speeds, and for disposing said blocking means out of said blocking relationship to permit clutching shift of the shiftable clutch member, when the speeds of said structures cross, the balking ring having friction faces presented axially in opposite directions, one coacting with the former friction face, means rotatable with the first structure and coacting with the other friction face of the balking ring, and a spring-pressed plunger carried by the balking ring and thrusting against the first friction face of said one structure and tending to thrust the balking ring axially against the last-mentioned means.

CARL D. PETERSON.
ALBERT H. DEIMEL.